Patented Feb. 5, 1952

2,584,527

UNITED STATES PATENT OFFICE 2,584,527

UNSATURATED DICARBOXYLIC ACIDS AND ESTERS AND THEIR PREPARATION

Charles J. Albisetti, Jr., and Norman G. Fisher, Wilmington, Del., assignors to E. I. du Pont de Nemours & Company, Wilmington, Del., a corporation of Delaware No Drawing. Application November 2, 1949, Serial No. 125,164

17 Claims. (Cl. 260—485)

This invention relates to new unsaturated dicarboxylic acids and their esters and to a method for their preparation.

Various unsaturated, aliphatic dicarboxylic acids and their esters are known. However, the hitherto known methods for producing them have not been capable of producing aliphatic dicarboxylic acids or esters having a non-conjugated ethylenic linkage in certain desirable positions in the hydrocarbon radical between the two carboxyl groups.

It is an object of this invention to provide new unsaturated dicarboxylic acids and their esters. A further object is to provide a new method for preparing unsaturated dicarboxylic acids and their esters. Other objects will appear hereinafter.

These objects are accomplished by providing novel dicarboxylic acids and their esters, having a contiguous chain of seven carbon atoms between the carboxy groups, and having a single non-conjugated ethylenic linkage and that attached to the fourth carbon atom in the said seven-carbon chain. These acids and their esters are prepared by heating under superatmospheric pressure a mixture free from a polymerization catalyst and containing acrylic acid or an alpha-alkylacrylic acid, or an ester thereof, and a 5-alkenoic acid, or an ester thereof, having adjacent to the doubly-bonded fifth carbon atom a carbon having attached thereto at least one hydrogen.

The novel dicarboxyl acids and their esters are difunctional compounds consisting solely of hydrocarbon apart from the functional groups and having a contiguous chain of seven carbon atoms separating said functional groups with a single non-conjugated ethylenic linkage and that attached to the fourth carbon atom in the said seven-carbon chain, the two functional groups being identical and being selected from the class consisting of carboxylic acid and ester groups. The divalent radical separating the functional groups is an open-chain aliphatic hydrocarbon radical, preferably containing from seven to eighteen carbon atoms. This aliphatic hydrocarbon radical separating the functional groups can contain aliphatic hydrocarbon side chains, preferably of from 1 to 5 carbon atoms. Thus novel dicarboxylic acids and esters of this invention can contain an aliphatic open-chain hydrocarbon side chain of from 1 to 5 carbon atoms attached by a double bond to the fourth carbon atom in the seven-carbon chain separating the functional groups. The functional groups can be represented by the radical —COOX wherein X is hydrogen or hydrocarbon free from aliphatic unsaturation. Thus X may be any saturated aliphatic, saturated cycloaliphatic or aromatic monovalent hydrocarbon radical, e. g., methyl, ethyl, n-propyl, isopropyl, n-butyl, n-octyl, n-decyl, cyclohexyl and phenyl. It is preferred that X be hydrogen or a hydrocarbon radical free from aliphatic unsaturation of from 1 to 10 carbon atoms. The alkyl esters in which X is an alkyl radical of from 1 to 4 carbon atoms are particularly preferred.

A suitable method for carrying out the process of this invention consists in heating a mixture of the acrylic or alpha-alkylacrylic acid, or ester thereof, e. g., methyl methacrylate, and the 5-alkenoic acid, or ester thereof, e. g., methyl 5-hexenoate, in equimolar proportions, or preferably with an excess of the 5-alkenoic compound, in a closed reaction vessel capable of withstanding superatmospheric pressure to a temperature between 200° and 400° C., under the autogenous pressure developed by the reaction mixture, usually of from 25 to 1000 atmospheres. It is essential that no polymerization catalyst be present in the reaction mixture. A polymerization inhibitor, e. g., hydroquinone, is advantageously included in the reaction mixture to prevent polymerization of the polymerizable component, e. g., acrylic acid compounds; however, the inhibitor is not essential as the reaction proceeds in the absence of such a material. The resultant unsaturated dicarboxylic acids, or esters thereof, are isolated from the reaction mixture by conventional methods, e. g., by fractional distillation. In carrying out this reaction, it is preferable that both the reactants be either the free acids or the esters, since if one reactant is the free acid and the other reactant is an ester, the resulting product is a mixture of acids and esters.

The process of this invention can also be carried out in a continuous manner. In this embodiment, which is very desirable for large-scale operations, the mixture of of acrylic acid or ester and the 5-alkenoic acid or ester is passed through a heated reaction tube under superatmospheric pressure, e g., 25 to 1000 atm., and if desired in the presence of an inert diluent, e. g., benzene, heated to a temperature between 200° to 400° C., and preferably at 250° to 350° C.

The 5-alkenoic acids, or esters thereof, used as one of the reactants in the process of this invention are prepared by heating at 200° to 400° C. under superatmospheric pressure (the autogenous pressure developed by the reaction mixture, usually 25 to 1000 atmospheres) a mixture free from a polymerization catalyst containing acrylic acid or an alpha-alkylacrylic acid, or an ester thereof, and a monoolefinic hydrocarbon having adjacent to one of the doubly bonded carbons a carbon atom having attached thereto at least one hydrogen atom. Examples of such monoolefinic hydrocarbons are propylene, 1-butene, 2-butene, isobutylene and diisobutylene. The acrylic or alkylacrylic acid, or ester thereof, used in the preparation of the 5-alkenoic acid or ester can be either the same as or different from the acrylic or alkylacrylic acid, or ester thereof, which is to be reacted with the intermediate 5-alkenoic acid or its ester.

The invention is illustrated further by the following examples in which the proportions of the reactants are expressed in parts by weights unless otherwise specified.

EXAMPLE I

Part A

A mixture of 28.2 parts of methyl 5-methyl-5-hexenoate, 34.4 parts of methyl acrylate and 25 parts of benzene containing a trace of hydroquinone as polymerization inhibitor is heated in a closed reaction vessel capable of withstanding superatmospheric pressure at 260° C. for 4 hours. On distillation of the reaction mixture there is obtained, after removal of benzene and unreacted methyl acrylate and methyl 5-methyl-5-hexenoate, 10 parts of dimethyl 5-methylenenonanedioate, boiling at 100–105° C. at about 1 mm., and 30 parts of higher boiling residues. The position of the ethylenic linkage in this unsaturated ester is confirmed by infra-red absorption spectra.

The reaction is more conveniently carried out by using an excess of the nonpolymerizable component, i. e., the 5-alkenoate.

Hydrolysis of dimethyl 5-methylenenonanedioate with alcoholic potassium hydroxide yields 5-methylenenonanedioic acid, a liquid boiling at 180° C. at about 0.5 mm.

Part B

When a mixture of 142 parts of methyl 5-methyl-5-hexenoate, 64 parts of methyl acrylate and 10 parts of hydroquinone is heated under the same conditions and for the same time as in the preceding Part A of this Example there is obtained 57 parts of dimethyl 5-methylenenonanedioate boiling at 100–105° C. at 0.3 mm. Redistillation of the crude ester gives a product boiling at 121–123° C. at 2.5 mm. and having a refractive index, $n_D^{25}$, of 1.4500, and a saponification equivalent of 114.2 (calculated, 114.14).

Hydrogenation of the unsaturated diester in the presence of methanol and a palladium-on-carbon catalyst at 50° C. under 1000 lb. per sq. in. hydrogen pressure gives dimethyl 5-methylnonanedioate which, after purification, boils at 127.5–128.5° C. at 3.0 mm., and has a refractive index, $n_D^{25}$, of 1.4370, and a saponification equivalent of 115.1 (calculated, 115.15).

Hydrolysis of dimethyl 5-methylnonanedioate with alcoholic potassium hydroxide gives 5-methylnonanedioic acid, boiling at 180° C. at 0.5 mm., melting at 69°–71° C. (crystallized from acetonitrile), and a neutral equivalent of 101.5 (calculated, 101.2).

EXAMPLE II

A mixture of 18 parts of methyl 5-hexenoate 34 parts of methyl acrylate and 25 parts of benzene is heated in a closed reaction vessel for 4 hours at 260° C. The crude product, amounting to 70 parts, is distilled and there is obtained, after removal of solvent and unreacted ingredients, 3 parts of dimethyl 4-nonenedioate, boiling at 265–280° C., and 12 parts of higher boiling residues.

Hydrolysis of dimethyl 4-nonenedioate with alcoholic potassium hydroxide yields 4-nonenedioic acid.

Hydrogenation of the unsaturated diester in the presence of platinum as catalyst at 50° C. under 1000 lb. per sq. in. hydrogen pressure gives dimethyl azelate, boiling at 95–104° C./2.5 mm.

Saponification of the saturated diester with alcoholic potassium hydroxide gives azelaic acid, melting point 105–106.5° C. (crystallized from water).

EXAMPLE III

A mixture of 150 parts of methyl 2,5-dimethyl-5-hexenoate, 50 parts of methyl methacrylate and 1 part of hydroquinone is heated in a closed reaction vessel capable of withstanding superatmospheric pressure for 6 hours at 255° C. The crude product which is formed amounts to 190 parts. On distillation there is obtained, after removal of unreacted methyl methacrylate and methyl 2,5-dimethyl- 5-hexenoate, 22 parts of dimethyl 2,8-dimethyl-5-methylenenonanedioate boiling at 122–129° C. at 2 mm., and 24 parts of higher boiling residues. On redistillation the dimethyl methylenenonanedioate boils at 119–121° C./2 mm., has a refractive index, $n_D^{25}$, of 1.4481, and a saponification equivalent of 128.8 (calculated, 128.2).

Hydrolysis of dimethyl 2,8-dimethyl-5-methylenenonanedioate with alcoholic potassium hydroxide yields 2,8-dimethyl-5-methylenenonanedioic acid.

Treatment of a methanol solution of the unsaturated diester with hydrogen at 1000 lbs. per sq. in. pressure at 50° C. in the presence of a palladium-on-carbon catalyst gives dimethyl 2,5,8-trimethylnonanedioate, boiling at 116–118° C./1.5 mm., having a refractive index, $n_D^{25}$, of 1.4372, and a saponification equivalent of 130.0 (calculated, 129.2).

Saponification of the saturated diester with alcoholic potassium hydroxide gives 2,5,8-trimethylnonanedioic acid, boiling at 180–181° C./0.5 mm., and having a neutral equivalent of 115.42 (calculated, 115.15).

EXAMPLE IV

A mixture of 192 parts of 5-methyl-5-hexenoic acid, 54 parts of acrylic acid and 0.1 part of hydroquinone is heated at 245° C. for 4 hours in a pressure reactor. The crude reaction product amounts to 210 parts. On distillation there is obtained, after removal of excess acrylic acid and hexenoic acid, 60 parts of 5-methylenenonanedioic acid, a viscous liquid boiling at 188–196° C. at 1 mm., and 20 parts of higher boiling residues.

The unsaturated acid is reduced with hydrogen at 50° C. in the presence of dioxane and a palladium-on-carbon catalyst. Crystallization of the hydrogenated product from acetonitrile gives 5-methylnonanedioic acid melting at 69–71° C.

EXAMPLE V

A mixture of 192 parts of 5-methyl-5-hexenoic acid, 90 parts of 60% aqueous acrylic acid and 0.1 part of hydroquinone is heated at 300° C. for 15 minutes in a pressure vessel. Distillation of the product gives, in addition to recovered reactants, 20 parts of 5-methylenenonanedioic acid, B. P. 181–190° at about 1 mm.

In addition to the acrylic acid, methyl acrylate, and methyl methacrylate of the examples, other alpha-alkylacrylic acids and other esters thereof can be used in the process of this invention. Preferably the alkyl group in the alpha-alkylacrylic acids and esters contains from 1 to 3 carbon atoms. The acrylic and alpha-alkylacrylic acids can be esterified with any saturated aliphatic or saturated cycloaliphatic alcohol, or any phenol, e. g., methyl, ethyl, n-propyl, isobutyl, n-octyl, n-decyl and cyclohexyl alcohols, phenol and o-cresol. Specific examples of alpha-alkylacrylic acid compounds which can be substituted for those of the examples include alpha-propylacrylic acid, isobutyl methacrylate, n-decyl acrylate, cyclohexyl alpha-ethylacrylate, and phenyl acrylate.

The acrylic and alpha-alkylacrylic acids and their esters can be represented by the formula

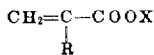

wherein R is hydrogen or an alkyl radical, preferably of from 1 to 3 carbon atoms and X is hydrogen or a monovalent hydrocarbon radical free from aliphatic unsaturation and preferably containing from 1 to 10 carbon atoms. The alkyl esters in which X is an alkyl group of 1 to 4 carbon atoms are particularly preferred.

Likewise, other 5-alkenoic and 5-hexenoic acids having attached to the fifth carbon of the alkenoic chain a carbon atom having attached thereto at least one hydrogen atom, and esters thereof, besides those mentioned in the examples, can be used in the process of this invention. The preferred 5-alkenoic acids, and esters thereof, are unsaturated monocarboxylic acids (1) containing from 6 to 14 carbon atoms, at least 5 of these carbons being in a straight chain joined to the carboxy group, (2) having but one unsaturated linkage and that an ethylenic bond joined to the fourth carbon atom of said 5-carbon chain, and (3) having adjacent to said doubly bonded carbon a carbon atom having attached thereto at least one hydrogen atom, and esters thereof. As in the case of the acrylic and alkylacrylic esters the 5-alkenoic acids can be esterified with any aliphatic or cycloaliphatic alcohol, or any phenol, e. g., methyl, ethyl, n-propyl, isopropyl, n-butyl, n-octyl, n-decyl and cyclohexyl alcohols, and phenol. Specific examples of other suitable reactants of this type include 5-hexenoic acid, isobutyl 5-hexenoate, cyclohexyl 2-ethyl-5-hexenoate, 7,7-dimethyl-5-methyleneoctanoic acid, 4-methyl-5-hexenoic acid, n-decyl 4-methyl-5-hexenoate, and phenyl 5-hexenoate.

The 5-alkenoic compounds have the terminal functional group —COOX wherein X is hydrogen or a monovalent hydrocarbon radical free from aliphatic unsaturation, and preferably of from 1 to 10 carbon atoms. The alkyl esters in which X is an alkyl group of from 1 to 4 carbon atoms are particularly preferred. It is essential that the fifth carbon atom of the 5-alkenoic chain has attached thereto a carbon atom having joined to it at least one hydrogen atom. The 5-alkenoic chain can contain branch alkyl groups, preferably of from 1 to 5 carbon atoms. 5-alkenoic compounds in which the alkene chain contains from 6 to 12 carbon atoms are particularly preferred.

Especially preferred 5-alkenoic acids and their esters are those having an aliphatic side chain of from 1 to 5 carbon atoms attached to the 5th carbon atom.

Thus, in addition to the novel dicarboxylic acids and esters described in the examples, this invention includes among others the following unsaturated acids and esters which can be made from the specific reactants mentioned previously:

Diisobutyl 4-nonenedioate,
Di-n-decyl 4-methyl-4-nonenedioate,
5-(2,2 - dimethylpropylidene) - 2,8 - di - n - propylnonanedioic acid,
Diphenyl 4-nonenedioate,
Dicyclohexyl 2,8-diethyl-4-nonenedioate,
2-ethyl-5-methylenenonanedioic acid, and
5-2,2-dimethylpropylidene) nonanedioic acid.

A more precise understanding of this reaction may be afforded by the following mechanism, which is believed to represent the course of the addition of methyl acrylate to methyl 5-hexenoate:

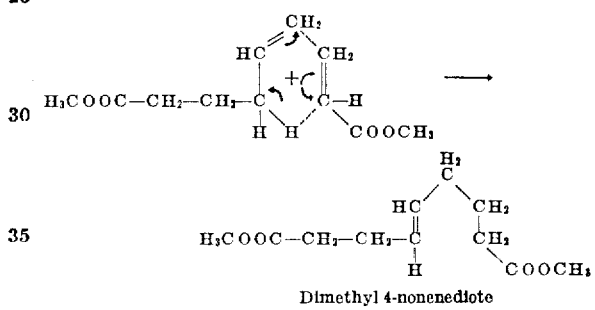

Dimethyl 4-nonenedioate

The two compounds are represented as approaching in such a way as to approximate a six-membered ring. Arrows indicate shifts of electron pairs, i. e., relocation of bonds between atoms.

As indicated previously the proportions of the two types of reactants can be varied widely in the process of this invention. Equimolar proportions of the acrylic acid or ester compound and the 5-alkenoic acid or ester compound are operable, but it is preferable to use an excess, preferably a 300–400% excess, of the 5-alkenoic acid or ester compound as better yields of the resultant unsaturated carboxylic acid or ester compound are obtained under these conditions.

The hydroquinone polymerization inhibitor mentioned in the examples can be replaced, if desired, by other polymerization inhibitors. Examples of other materials of this type which can be used include copper resinate, naphthylamines, beta-naphthol and other antioxidants.

The reaction between the acrylic acid or ester compound and the 5-alkenoic acid or ester compound takes place, under the conditions described previously, in the absence of an inert diluent or solvent. However, a solvent or diluent can be used if desired. In this case inert organic solvents which can be used include hydrocarbons, such as benzene, toluene, and cyclohexane; ethers, such as dioxane; and esters, such as ethyl or butyl acetate. The reaction can also be carried out in the presence of water as a diluent, the water serving as a heat transfer medium. However, because of the tendency of water to hydrolyze esters, it is naturally preferred, when esters are employed as reactants, to use short reaction times, e. g., as in a continuous process, to minimize the hydrolysis reaction.

The products obtained by the process of this invention are particularly useful as chemical intermediates. The unsaturated dicarboxylic acids and esters can be hydrogenated to the corresponding saturated dicarboxylic acids or esters. The esters can be hydrolyzed to the corresponding dicarboxylic acids. 4-nonenedioic acid and its esters are particularly useful for conversion to azelaic acid and its esters, which have been difficult to synthesize by previously known methods. The esters of 4-nonenedioic acid are also useful in the manufacture of elastic polyesters. The saturated diesters obtained from the unsaturated dicarboxylic acid esters are also useful for reaction with diamines to form polyamides.

As many apparently widely different embodiments of this invention may be made without departing from the spirit and scope thereof, it is to be understood that this invention is not limited to the specific embodiments thereof except as defined in the appended claims.

We claim:

1. A difunctional compound consisting solely of hydrocarbon apart from the two functional groups and having an open-chain of seven contiguous aliphatic carbon atoms separating said two functional groups with a single non-conjugated ethylenic linkage and that attached to the fourth carbon atom in the said seven-carbon chain, the two functional group being identical and being represented by the radical —COOX wherein X is selected from the class consisting of hydrogen and monovalent hydrocarbon radicals of 1 to 10 carbon atoms free from aliphatic unsaturation.

2. A dicarboxylic ester consisting solely of hydrocarbon apart from the two carboxylic ester groups and having an open-chain of seven contiguous aliphatic carbon atoms separating said two carboxylic ester groups with a single non-conjugated ethylenic linkage and that attached to the fourth carbon atom in the seven-carbon chain, the two carboxylic ester groups being identical and being represented by the radical —COOX wherein X is a monovalent hydrocarbon radical of 1 to 10 carbon atoms free from aliphatic unsaturation.

3. A dicarboxylic ester consisting solely of hydrocarbon apart from the two carboxylic ester groups and having an open-chain of seven contiguous aliphatic carbon atoms separating said two carboxylic ester groups with a single non-conjuguated ethylenic linkage and that attached to the fourth carbon atom in the seven-carbon chain, the two carboxylic ester groups being identical and being represented by the radical —COOX wherein X is an alkyl radical of 1 to 4 carbon atoms.

4. A dicarboxylic acid consisting solely of hydrocarbon apart from the two carboxy groups and having an open-chain of seven contiguous aliphatic carbon atoms separating said two carboxy groups with a single non-conjugated ethylenic linkage and that attached to the fourth carbon atom in the said seven-carbon chain.

5. The chemical compound, dimethyl 5-methylenenonanedioate.

6. The chemical compound, dimethyl 4-nonenedioate.

7. The chemical compound, dimethyl 2,8-dimethyl-5-methylenenonanedioate.

8. The chemical compound, 5-methylenenonanedioic acid.

9. A method for preparing an unsaturated difunctional compound which comprises heating under superatmospheric pressure a mixture free from a polymerization catalyst and containing as the sole reactants (1) an acrylic compound having the formula

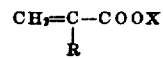

wherein R is selected from the group consisting of hydrogen and alkyl radicals of 1 to 3 carbon atoms and X is selected from the group consisting of hydrogen and monovalent hydrocarbon radicals of 1 to 10 carbon atoms free from aliphatic unsaturation and (2) a 5-alkenoic compound containing as the sole carbon-to-carbon unsaturation in the alkenoic chain the double bond attached to the fifth carbon atom and wherein said doubly-bonded fifth carbon atom has attached thereto a carbon atom joined to at least one hydrogen atom, said 5-alkenoic compound having the terminal functional group —COOX wherein X is selected from the group consisting of hydrogen and monovalent hydrocarbon radicals of 1 to 10 carbon atoms free from aliphatic unsaturation, and separating from the reaction mixture a difunctional compound having an open-chain of seven contiguous aliphatic carbon atoms separating the two functional groups with a single non-conjugated ethylenic linkage and that attached to the fourth carbon atom in the said seven-carbon chain.

10. A method for preparing an unsaturated dicarboxylic ester which comprises heating under superatmospheric pressure a mixture of free from a polymerization catalyst and containing as the sole reactants (1) an acrylic ester having the formula

wherein X is a monovalent hydrocarbon radical of 1 to 10 carbon atoms free from aliphatic unsaturation and (2) a 5-alkenoic ester containing as the sole carbon-to-carbon unsaturation in the alkenoic chain the double bond attached to the fifth carbon atom and wherein said doubly-bonded fifth carbon atom has attached thereto a carbon atom joined to at least one hydrogen atom, said 5-alkenoic ester having the terminal functional group —COOX wherein X is a monovalent hydrocarbon radical of 1 to 10 carbon atoms free from aliphatic unsaturation, and separating from the reaction mixture a dicarboxylic ester having an open-chain of seven contiguous aliphatic carbon atoms separating the two carboxylic ester groups with a single non-conjugated ethylenic linkage and that attached to the fourth carbon atom in the seven-carbon chain.

11. A method for preparing an unsaturated dicarboxylic ester which comprises heating under superatmospheric pressure a mixture free from a polymerization catalyst and containing as the sole reactants (1) an acrylic ester having the formula

wherein X is an alkyl radical of 1 to 4 carbon atoms and (2) a 5-alkenoic ester containing as the sole carbon-to-carbon unsaturation in the alkenoic chain the double bond attached to the fifth carbon atom and wherein said doubly-bonded fifth carbon atom has attached thereto a carbon atom joined to at least one hydrogen atom, said 5-alkenoic ester having the terminal functional group —COOX wherein X is an alkyl radical of 1 to 4 carbon atoms, and separating from the reaction mixture a dicarboxylic ester having an open-chain of seven contiguous aliphatic carbon atoms separating the two carboxylic ester groups with a single non-conjugated ethylenic linkage and that attached to the fourth carbon atom in the seven-carbon chain.

12. A method for preparing an unsaturated dicarboxylic ester which comprises heating under superatmospheric pressure a mixture free from a polymerization catalyst and containing as the sole reactants (1) an alpha-alkylacrylic ester having the formula

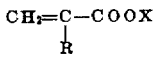

wherein R is an alkyl radical of 1 to 3 carbon atoms and X is a monovalent hydrocarbon radical of 1 to 10 carbon atoms free from aliphatic unsaturation and (2) a 5-alkenoic ester containing as the sole carbon-to-carbon unsaturation in the alkenoic chain the double bond attached to the fifth carbon atom and wherein said doubly-bonded fifth carbon atom has attached thereto a carbon atom joined to at least one hydrogen atom, said 5-alkenoic ester having the terminal functional group —COOX wherein X is a monovalent hydrocarbon radical of 1 to 10 carbon atoms free from aliphatic unsaturation, and separating from the reaction mixture a dicarboxylic ester having an open-chain of seven contiguous aliphatic carbon atoms separating the two carboxylic ester groups with a single non-conjugated ethylenic linkage and that attached to the fourth carbon atom in the seven-carbon chain.

13. A method for preparing an unsaturated dicarboxylic acid which comprises heating under superatmospheric pressure a mixture free from a polymerization catalyst and containing as the sole reactants (1) acrylic acid and (2) a 5-hexenoic acid containing as the sole carbon-to-carbon unsaturation in the hexenoic chain the double bond attached to the fifth carbon atom and wherein said doubly-bonded fifth carbon atom has attached thereto a carbon atom joined to at least one hydrogen atom, and separating from the reaction mixture a dicarboxylic acid having an open-chain of seven contiguous aliphatic carbon atoms separating the two carboxy groups with a single non-conjugated ethylenic linkage and that attached to the fourth carbon atom in the seven-carbon chain.

14. A method for preparing an unsaturated dicarboxylic ester which comprises heating under superatmospheric pressure a mixture free from a polymerization catalyst and containing as the sole reactants (1) methyl acrylate and (2) methyl 5-methyl-5-hexenoate and separating from the reaction mixture dimethyl 5-methylenenonanedioate.

15. A method for preparing an unsaturated dicarboxylic ester which comprises heating under superatmospheric pressure a mixture free from a polymerization catalyst and containing as the sole reactants (1) methyl acrylate and (2) methyl 5-hexenoate and separating from the reaction mixture dimethyl 4-monenedioate.

16. A method for preparing an unsaturated dicarboxylic ester which comprises heating under superatmospheric pressure a mixture free from a polymerization catalyst and containing as the sole reactants (1) methyl methacrylate and (2) methyl 2,5-dimethyl-5-hexenoate and separating from the reaction mixture dimethyl 2,8-dimethyl-5-methylenenonanedioate.

17. A method for preparing an unsaturated dicarboxylic acid which comprises heating under superatmospheric pressure a mixture free from a polymerization catalyst and containing as the sole reactants (1) acrylic acid and (2) 5-methyl-5-hexenoic acid and separating from the reaction mixture 5-methylenenonanedioic acid.

CHARLES J. ALBISETTI, JR.
NORMAN G. FISHER.

REFERENCES CITED

The following references are of record in the file of this patent:

UNITED STATES PATENTS

| Number | Name | Date |
|---|---|---|
| 2,055,456 | Eichwald | Sept. 22, 1936 |
| 2,230,055 | Moser | Jan. 28, 1941 |
| 2,297,039 | Van Melsen | Sept. 29, 1942 |

OTHER REFERENCES

English: J. Am. Chem. Soc., vol. 63, pp. 941–943 (1941).

Certificate of Correction

Patent No. 2,584,527 February 5, 1952

CHARLES J. ALBISETTI, Jr., ET AL.

It is hereby certified that error appears in the printed specification of the above numbered patent requiring correction as follows:

Column 1, line 33, for "dicarboxyl" read *dicarboxylic*; column 6, line 19, for "5-2,2-dimethylpropylidene)nonanedioic acid" read *5-(2,2-dimethylpropylidene)nonanedioic acid*; line 38, for "Dimethyl 4-nonenediote" read *Dimethyl 4-nonenedioate*; column 7, line 30, for "group" read *groups*; column 10, line 17, for "4-monenedioate" read *4-nonenedioate*;

and that the said Letters Patent should be read as corrected above, so that the same may conform to the record of the case in the Patent Office.

Signed and sealed this 6th day of May, A. D. 1952.

[SEAL]

THOMAS F. MURPHY,
*Assistant Commissioner of Patents.*